United States Patent

[11] 3,573,505

[72] Inventors Fritz H. Gaensslen
Yorktown Heights;
Dominic P. Spampinato, Ozone Park, N.Y.
[21] Appl. No. 744,903
[22] Filed July 15, 1968
[45] Patented Apr. 6, 1971
[73] Assignee International Business Machines Corporation
Armonk, N.Y.

[54] BISTABLE CIRCUIT AND MEMORY CELL
16 Claims, 5 Drawing Figs.

[52] U.S. Cl. .................... 307/279,
307/251, 307/289, 307/304, 307/317
[51] Int. Cl. .................... H03k 3/26
[50] Field of Search .................... 307/205,
251, 279, 304, 289, 317

[56] References Cited

UNITED STATES PATENTS 3,471,712 10/1969 Tomozawa et al. ........... 307/279X
3,490,007 1/1970 Igarashi ........................ 307/291X

FOREIGN PATENTS 883,757 12/1961 Great Britain ................ 307/289

OTHER REFERENCES

IBM Technical Disclosure Bulletin Vol. 8, No. 12, May 1966, pp 1838 & 1839, titled FIELD EFFECT MEMORY CELL WITH LOW STANDBY POWER & HIGH SWITCHING SPEED by P. Pleshko. A copy is located in 307/304 in Art Unit 254.

*Primary Examiner*—Stanley T. Krawczewicz
*Attorneys*—Hanifin and Jancin and Thomas J. Kilgaannon, Jr.

ABSTRACT: A memory cell in which the load devices thereof are unidirectional devices such as diodes, In the cell, where the storage devices are PNP or NPN devices, the diode load devices are disposed in the circuit such that the PN junctions of the diodes are backward biased. The storage devices, which are cross-coupled, and the diode load devices are connected at nodes to which gated drivers are also connected for the purpose of applying appropriate voltages to the nodes and, therefore, to the gate electrodes of the storage devices to change the conducting state of the storage devices during an active state. The gated drivers when turned on, also provide a portion of a current path to detect the conducting state of one or the other of the storage devices. In a quiescent state, the diode load devices in conjunction with a backward-biased PN junction portion of the OFF storage device form a nonlinear voltage divider which, because of their relative impedances, apply a voltage at the node of the OFF storage device to which the gate of the ON storage device is connected which maintains that storage device in the ON condition during the quiescent state. A bistable circuit and a nondestructive readout memory array are also disclosed.

Patented April 6, 1971 3,573,505

2 Sheets-Sheet 1

INVENTORS
FRITZ H. GAENSSLEN
DOMINIC P. SPAMPINATO
BY Thomas J. Kilgannon Jr.
ATTORNEY

BISTABLE CIRCUIT AND MEMORY CELL

BACKGROUND OF THE INVENTION

1. Field of the Invention

This invention relates generally to information storage arrangements which utilize stored charge memory cells as a basic element of the storage arrangements. More specifically, it relates to active electronic memory arrangements in which field effect transistors and diodes are arranged to provide a memory cell which requires extremely small standby power in the quiescent state; utilizes devices with small area requirements in place of the usual field effect load devices; and incorporates combinations of unipolar and diode devices which are amenable to simple fabrication techniques. The resulting memory cells have reduced power consumption and can be delineated without materially increasing the surface area over that required for certain known memory cells and, relative to certain other memory cells, the present cells can be delineated in substantially smaller areas.

2. Description of the Prior Art

Devices which store electrical energy in various forms have been known for a number of years and, since the discovery of the field effect transistor (FET), a number of circuits have evolved which take advantage of the ability of the FET to store charge and act as a memory cell in arrangements which are built around a basic flip-flop configuration. Most of the known arrangements utilize anywhere from six to eight FET devices in conjunction with other circuit elements. The common factor in all the prior art devices is the utilization of a circuit, when the cell is in the quiescent state, which maintains charge on the gate capacitance of the ON portion of a bistable circuit. This circuit provides a low current through a high impedance to compensate for the leakage of charge from the gate capacitance through the OFF portion of the bistable circuit to ground. When it is appreciated that maintenance of charge on the storage device is a major factor in the design of known memory cells requiring additional devices having special characteristics which require relatively large layout area, it can be seen that any reduction in either the number of devices or layout area of such devices represents an end result which would find immediate acceptance by practitioners in the monolithic memory art.

Where separate load devices are used to maintain charge in the quiescent state, the trend is not toward reduced layout area. For example, to obtain extremely high resistance using FET devices (which would limit dissipation) the width to length ratio of the device becomes very small and requires more layout area than lower resistance FET devices. Further, even if such high resistances were obtainable using FET devices, the restrictions on operating conditions of memory cells incorporating such load FET's are rather severe because of the changing voltage seen at a node of the memory cell which, to attain most favorable operating conditions, should be substantially constant. Thus, in known prior art memory cells, the designer is faced with a number of trade-offs, the choice of any one of which results in the degradation of some other parameter which, in turn, militates against obtaining the ultimate in design. Design trade-offs are particularly disadvantageous where memories of large capacity are being built because the acceptance of one trade-off relative to another usually results in economic losses which are out of proportion to the advantage gained.

More recently, the design and economic dilemma referred to has been at least partially solved by the use of complementary unipolar devices arranged in a memory cell configuration and disclosed in a copending application Ser. No. 697,713, filed Jan. 15, 1968, entitled STORED CHARGE MEMORY CELL, by F. H. Gaensslen and D. P. Sampinato and assigned to the same assignee as the present invention. In this application, an FET device which is the complement of FET devices arranged in a cross-coupled flip-flop arrangement is connected to each of the cross-coupled FET's. The complementary FET's, perform the functions in one device of the usual load devices and the drivers usually required to change the state of the flip-flop. During the active state, when the cross-coupled FET's are being switched, the complementary FET's act as normal FET's being gated on to apply appropriate voltages to the gate electrodes of the cross-coupled FET's. During the quiescent state, the complementary FET's are switched off and, the drain diffusions of the OFF cross-coupled FET and its serially disposed complementary FET act as back-biased PN junctions having leakages which maintain a desired voltage at the gate electrode of the ON cross-coupled FET. The memory cell shown in the above-mentioned copending application has been characterized as partially solving the design and economic problems inherent in prior art devices because, while it does represent the simplest configuration believed obtainable, the nature of the complementary devices causes certain problems during which devices are of one conductivity type and the diffusion of the serially disposed complementary devices are of the opposite conductivity type, two separate additional diffusions are required with all the attendant masking, etching, and delineation problems associated with two separate diffusion steps. The cells of the present invention have all the advantages of the complementary cell arrangement and, in addition, it is simpler to manufacture. It has lower standby power requirements than the well-known cell which incorporates six FET's, two of which are utilized as load devices; it has lower area requirements than the latter and requires one less interconnection line than the latter arrangement.

SUMMARY OF THE INVENTION

The apparatus of the present invention, in one aspect, comprises a memory cell which consists of two FET devices in a cross-coupled configuration. A pair of driver FET's are connected to the cross-coupled FET's at nodes. The gates of the driver FET's are connected to a common word line; the sources are connected to a separate node and, each of their drains is connected to a bit-sense line. A pair of diodes, each connected to a common voltage source, are maintained in the circuit in a backward biased condition and each is connected to a separate node in parallel with a driver FET. Pulsed sources are coupled to the bit-sense lines and to the word line to apply an appropriate pulse pattern for writing into the cell and for nondestructively reading stored information out of the cell. A leakage path is also provided which, regardless of the variation in the voltages across the FET's of the memory cell, provides a substantially constant current which establishes a voltage at the node which maintains charge on the gate capacitance of the ON FET.

In accordance with another aspect of this invention, the memory cell described above can be modified to act as a bistable circuit which is a basic configuration appearing in charge storage memory cells of the type described. Since a bistable circuit assumes one of two stable states upon the application of voltages, all that is required is the application of an appropriate voltage to cause the bistable circuit to assume the other of its two stable states. The bistable circuit of the present invention consists of the cross-coupled FET's and the backward biased diodes connected to separate nodes. Upon the application of voltage to the diodes, one of the cross-coupled FET's assumes the ON condition and the other the OFF condition. By applying a voltage of sufficient amplitude to the node connected to the gate of the OFF cross-coupled FET, that FET will be turned ON, causing a potential sufficient to turn the ON FET OFF to appear at the node connected to the gate of the previously ON FET. During the quiescent state, the relative impedances of the PN junction of the OFF cross-coupled FET and the PN junction of the diode act as a nonlinear voltage divider and apply a voltage at the node connected to the gate of the ON FET sufficient to maintain the device in the ON condition. Again, power dissipation is extremely low because only leakage currents and leakage impedances are involved.

In accordance with more specific aspects of the invention, an FET device and a diode are connected in series and disposed in parallel relationship with a similar FET device and diode. The sources of the two FET's are grounded while their drains are cross-connected from a node to the gates of the opposing FET to form a well-known cross-coupled arrangement. The same drains are each connected in series at the node with a diode which is disposed relative to the FET's in a backward biased condition. Driver FET's are each connected to a separate node at their source connections in parallel with the backward biased diodes. The drain connections of the driver FET's are connected to pulsed sources which apply appropriate voltages to the nodes when it is desired to store information in one of the cross-coupled FET's. The gates of the driver FET's are connected to a common word line which supplies a voltage to the gates from a pulsed source to gate-on the driver FET's through which the bit line voltages are supplied.

A pulse pattern consisting of a negative excursion on the common word line which turns on the driver FET's and a positive voltage excursion on one of the bit lines causes the state of one of the cross-coupled FET's to be set where the cross-coupled FET's are P -channel enhancement mode devices. Reading is accomplished by applying a negative voltage excursion to the word line which causes current to flow through the driver FET and the ON portion of the cross-coupled FET and a bit-sense line.

During the quiescent state charge tends to leak off the gate capacitance of the ON device of the cross-coupled FET's. Provision is made, however, for supplying a current during the quiescent state of the memory cell which maintains the charge and thereby the voltage at a desired level at the gate of the ON FET. When the memory cell is quiescent, both driver FET's are nonconducting and the cross-coupled FET devices are electrically isolated from the voltage applied by a pulsed source connected to each of the driver FET's. At this point, however, a path for current flow exists between a voltage source connected to the backward-biased PN junctions of the diodes and a backward-biased junction of the OFF cross-coupled FET to a different potential via the substrate thereof which is held at that different potential. A parallel path also exists via a backward-biased PN junction of the driver FET associated with the OFF cross-coupled FET through the substrate thereof which is at the same potential as the substrate of the cross-coupled FET. In this arrangement, the total voltage applied to the diode is dropped in the series connected PN junctions. Since it is desired to maintain the voltage on the gate capacitance at a level to which it was charged, the characteristics of the PN junctions are adjusted during fabrication to permit a leakage current to flow which is governed by controlling the junction area or the doping level of the PN diffusions of the cross-coupled FET's and the driver FET's to permit a lower backward biased leakage current than in the diode. In this way, substantially the total voltage applied to the diode can be dropped across the backward-biased PN junctions of the cross-coupled FET and driver FET thereby maintaining the gate capacitance at the same voltage level to which it was originally charged.

Two things are accomplished by such control of the leakage current. The first is that extremely low leakage currents can be provided which reduce dissipation to a minimum during the quiescent state. The second is that the ON FET is not subject to a reduction in sense current due to a high standby-current through the series connected diode. Because of the low standby current through the ON FET a larger current swing is available during a read cycle. The ultimate amount of current is "pinch-off" current which, if reached, would cause the drain voltage to change rapidly resulting in a turning ON of the OFF FET.

With respect to the specific aspects of the bistable circuit disclosed, the circuit utilized is modified only to the extent that the driver FET's, the bit-sense lines and their associated pulsed sources are removed. In the resulting configuration, pulses of appropriate polarity (negative excursions) may be applied directly to the nodes or through diodes to cause the bistable circuit to change from one stable state to another. Quiescently, the diode and the backward-biased PN junction of the OFF device of the cross-coupled FET's act as a nonlinear voltage divider and apply a voltage to the node which is coupled to the gate of the ON device of the cross-coupled FET's to maintain that device in the ON condition.

It is, therefore, an object of this invention to provide a memory cell which requires a minimum number of FET devices.

Another object is to provide a memory cell in which standby power is reduced to a minimum.

Still another object is to provide a memory cell which is relatively simple to fabricate and is amenable to mass production techniques because PN junctions needed require only a single additional diffusion.

Yet another object is to provide a bistable circuit having low power dissipation requirements.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1A:
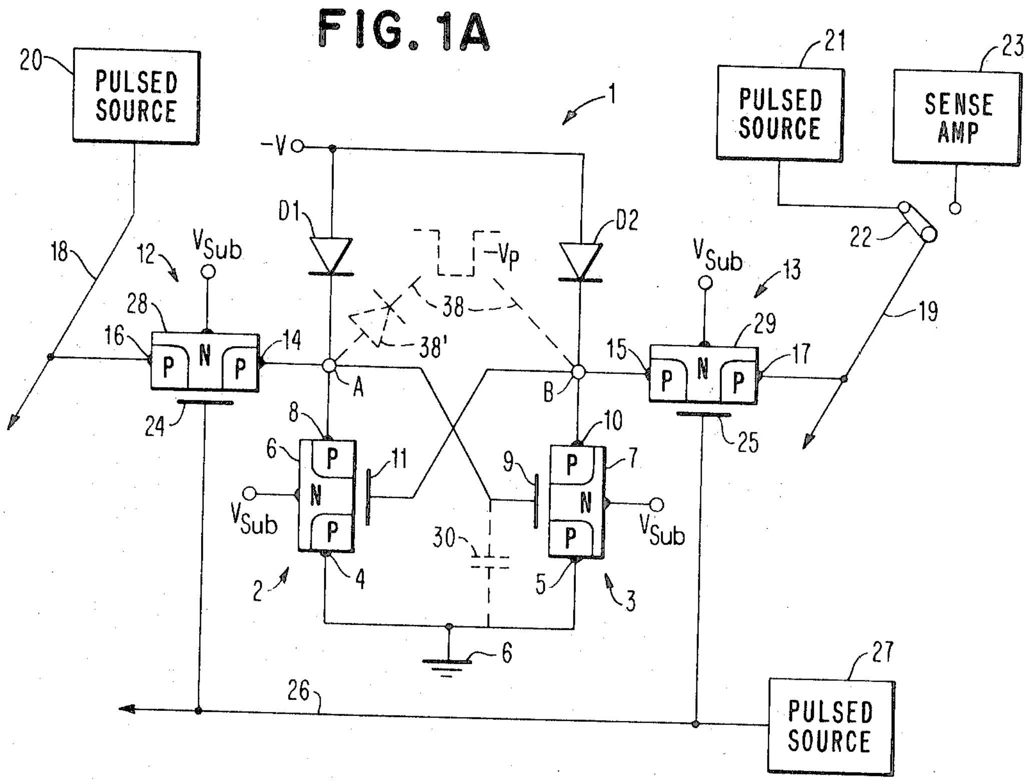
FIG. 1A is a schematic diagram of a bistable circuit and memory cell in accordance with the present invention showing the arrangement of FET devices, diodes and the associated pulsed sources required for reading and writing.

Referring now to FIG. 1A, a memory cell in accordance with the present invention is shown generally at 1. Memory cell 1 includes four field effect transistors all of which, for purposes of illustration, operate as normally OFF or enhancement mode devices.

In FIG. 1A, two identical field effect transistors (hereinafter called FET's) 2, 3 of the PNP or P-channel variety are shown schematically with their sources 4, 5, respectively, connected to a common ground 6.

Substrates 6, 7 of FET's 2, 3, respectively, are connected to a voltage source indicated as $V_{sub}$ in FIG. 1A. Drain 8 of FET 2 is shown connected to gate 9 of FET 3 and drain 10 of FET 3 is connected to gate 11 of FET 2. Connections from drain 8 and gate 9 and from drain 10 and gate 11 meet at nodes A and B, respectively. A circuit arranged in the configuration just described is a typical cross-coupled circuit well known to those skilled in the semiconductor art.

Connected in series with FET's 2, 3 are driver FET's 12,13, respectively. FET's 12,13 are substantially identical with FET's 2,3. By making the ($gm$) of the cross-coupled FET 2,3 greater, when reading occurs, current flowing through the ON devices of the cross-coupled FET's 2,3 will cause a voltage drop across the driver FET 12 or 13 which is higher than the voltage drop across the ON FET 2 or 3. The object is to cause as low a voltage as possible at the node A or B so there will be no danger of turning ON the OFF FET 2 or 3 by exceeding its threshold voltage. The nodes A, B, it should be recalled, connect the drain of the ON FET device to the gate of the OFF FET device.

In FIG. 1A, the drains 8,10 of FET's 2,3, respectively, are connected to diodes D1, D2, respectively; both of which are connected to a common voltage source designated $-V$. The polarity of the diodes D1, D2 is such that the diodes are backward biased and the only current which flows under such biasing conditions is a leakage current. In the integrated circuit environment, diodes D1, D2 are conveniently back-biased PN junction part of which can be diffused into a substrate at the same time the PN junctions in FET 2, 3 are created. An additional *n* diffusion is, of course, required to form a back-biased PN junction for the diodes.

In FIG. 1A, sources 14, 15 of driver FET's 12, 13, respectively, are shown connected to nodes A, B, respectively. Drains 16, 17 of FET's 12, 13, respectively, are shown connected to bit-sense lines 18, 19, respectively. The latter, in turn, are connected to pulsed sources 20, 21 from which are applied appropriate voltages which cause either FET 2 or 3 to change its conducting state. Bit-sense line 19 is shown connected to pulsed source 21 via switch 22 which, during a read cycle, is switched to connect to sense amplifier 23, to detect the flow of current through FET 3 to ground 6 when FET 3 is in the ON state. At all other times, bit-sense line 19 is connected to pulsed source 21 which is either energized or not energized during a writing period to change the state of memory cell 1.

Gates 24, 25 of driver FET's 12, 13, respectively, are connected via word line 26 to pulsed source 27. Substrates 28, 29 of driver FET's 12, 13, respectively, are connected to a substrate voltage designated $V_{sub}$ which is the same voltage applied to substrates 6, 7 of FET's 2,3, respectively.

Assuming FET 3 to be in the ON state, charge is stored in the lumped gate capacitance of FET 3 as represented by dotted capacitor 30, interconnected between gate 9 and source 5 of FET 3. An objective of the circuit of FIG. 1A is to maintain charge stored in capacitor 30 at a desired level so that information stored does not disappear due to leakage from capacitor 30.

Figure 2:
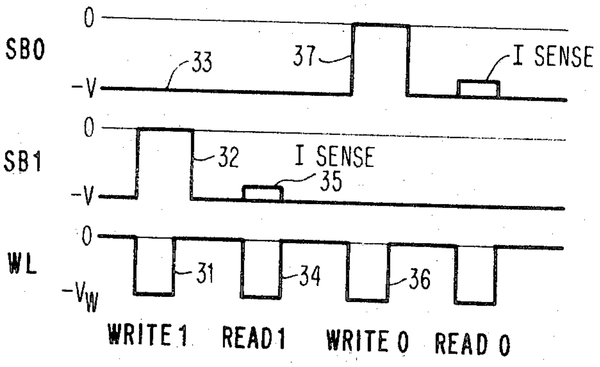
FIG. 2 is a representation of the voltage and current pulse patterns applied and obtained during reading and writing.

Writing into and reading out of memory cell 1 of FIG. 1A is accomplished using pulse patterns shown in FIG. 2 during respective writing and reading periods.

Assuming, for purposes of illustration that FET 2 is in the ON or conducting state from a previously applied pulse pattern and that it is desired to change its state, the following mode of operation is utilized:

Changing the state of memory cell 1 is a write operation which is accomplished by a positive voltage excursion applied to one of bit-sense lines 18, 19 and by the simultaneous application of a pulse via word line 26 from source 27 to the gates 24, 25 of driver FET 12, 13, respectively.

Thus, in FIG. 1A, with FET 2 in the ON state, gate 9 of FET 3 "sees" approximately zero volts thereby maintaining FET 3 in the OFF state. At this point, to turn FET 2 OFF and FET 3 ON, the pulse pattern shown in FIG. 2 is applied to memory cell 1 via word line 26 and bit-sense lines 18, 19. It should be recalled that PNP devices such as FET 2, 3, 12, 13 of FIG. 1A can be turned on by applying a voltage to the gate which is more negative than the voltage on the source of that device.

Thus, a voltage, having a negative excursion to some value $-V_w$, is applied from pulsed source 27 via word line 26 to the gates 24, 25 of FET's 12, 13, respectively. This pulse is shown at 31 in FIG. 2 and it causes FET's 12, 13 to assume a conducting condition. Simultaneously with the application of the word pulse, source 21 applies a voltage pulse 32 via bit line 19 and FET 13 to node B of memory cell 1. The voltage applied at node B is at ground potential. In the meantime, pulsed source 20 remains inactive and a voltage $-V$ shown at 33 in FIG. 2 is applied via word line 18 and FET 12 to node A of memory cell 1. Thus, a negative potential $-V$ is applied at node A while substantially zero potential is applied at node B. The negative potential on node A is effectively applied to gate 9 of FET 3 turning that device ON. Ground potential applied to node B is effectively applied to gate 11 of FET 2 turning that device OFF. The conduction state of the cross-coupled FET's 2, 3 has been changed by the application of appropriate voltages to nodes A, B, resulting in a charging up of gate capacitor 30 to a voltage equal to that applied at node A of memory cell 1.

To determine the state of memory cell 1, reading is undertaken by applying only a negative going pulse to word line 26 from pulsed source 27. This pulse shown at 34 in FIG. 2 turns on FET's 12, 13 which in conjunction with ON FET 3 causes current to flow through ON FET 3, FET 13 and bit-sense line 19. Current flow represented by pulse 35 in FIG. 2, is sensed in sense amplifier 23 which is electrically coupled to bit-sense line 19 by the actuation of switch 22. The turning on of FET 12 by pulse 34 also has the effect of applying a voltage $-V$ shown at 33 in FIG. 2, to node A and, therefore, to gate 9 of FET 3 thereby bringing the charge on gate capacitor 30 up to the maximum level attainable. Read out of memory cell 1 is, therefore, nondestructive.

Switching FET 2 back to the ON state is accomplished in substantially the same manner as described above in connection with switching FET 3 to the ON state with the exception that a pulse from pulsed source 20 is applied via bit-sense line 18 to node A and consequently to gate 9 of FET 3. Pulses 36, 37, as shown in FIG. 2, are applied from pulsed sources 27 and 20, respectively.

In FIG. 2, it should be noted that the voltages applied to each of the bit-sense lines 18, 19 are held during switching at the desired voltage levels for a longer period of time than the time at which the voltage level or word line 26 is held. This is done to make certain that gates 9, 11 of FET's 3, 2, respectively, are not exposed to a changing voltage before FET's 12, 13 are turned off by removal of voltage from word line 26.

As noted hereinabove, retention of charge stored on the gate capacitance of the ON device of the cross-coupled FET's is a significant aspect in the operation of FET memory cells. It is during the quiescent state that the condition of the memory must be maintained to compensate for leakage from the gate capacitance of the ON device. As also noted hereinabove, reading the memory cell applies the proper voltages to maintain the charge of the ON device but, it is clear that conditions may arise when reading of the cell is attempted after charge has leaked off the gate capacitance of the ON device. To obviate such a problem, charge is usually applied constantly using additional FET devices in the circuits and, significant currents are required resulting in high power dissipation. The circuit of FIG. 1A, eliminates the necessity for the utilization of devices having significant current, because it was recognized that a leakage path could be provided by taking advantage of the arrangement of the FET's 2,3 and diodes D1, D2 particularly with respect to the leakage paths formed by virtue of the series arrangement of FET 2 and diode D1 and FET 3 and diode D2.

Figure 1C:
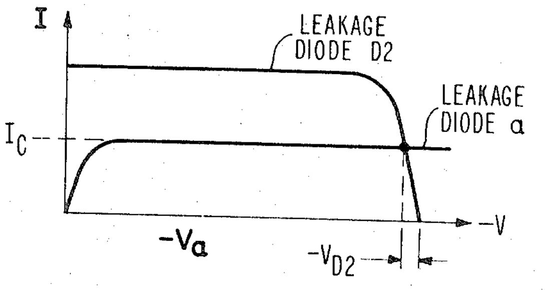
FIG. 1C is a graphical representation of the current-voltage characteristics of a backward-biased diode PN junction and cross-coupled FET backward-biased PN junction each having different leakage characteristics.
Figure 1B:
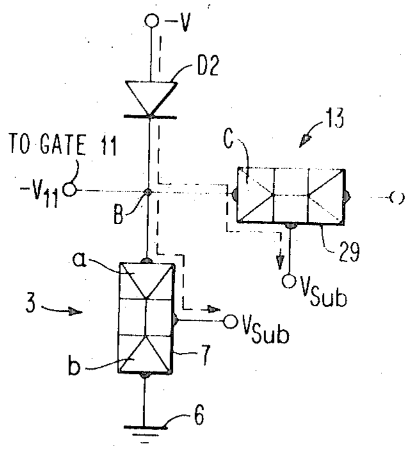
FIG. 1B is a schematic diagram of the OFF portion of the memory cell of FIG. 1A showing in detail the leakage current path and the voltages resulting therefrom when the memory cell is in the quiescent state.

FIG. 1B shows a schematic diagram of FET 3 and diode D2 with the PN junctions normally incorporated in FET devices by diffusion shown as diodes for purposes of explanation. FET 3 is assumed to be in the OFF state; a writing cycle having just been completed which placed a voltage $-V$ on gate 11 of ON FET 2. In FIG. 1B, this voltage is designated as $-V_{11}$. Diode D2 is represented by a diode which is backward biased by a voltage $-V$ which is applied to diodes D1, D2 and shown also in FIG. 1A. FET 3 is also represented by diodes *a*, *b*, which are disposed in a face-to-face relationship in FET 3. Substrate 7 of FET 3 is held at a potential of $V_{sub}$ which is assumed to be a positive voltage for purposes of explanation. By virtue of the arrangement shown, a series path is formed by voltage source $-V$, backward biased diode D2, backward biased diode *a*, substrate 7, and substrate voltage $V_{sub}$. The flow of current in the path defined is, of course, a leakage current and is governed by the leakage resistance of the backward biased diodes D2 and *a*. Since it is desired to maintain the voltage $-V_{11}$, at that level, and since the total voltage ($-V$) across the series path defined above must be dropped in the impedances represented by backward biased diodes *a* and D2, it was recognized that a voltage division could be made to occur whereby substantially the total voltage $-V$ could be dropped across diode $a$ by adjusting the leakage current of diode $a$ to be significantly lower than that of diode D2. The leakage current can be adjusted during fabrication by adjusting the area of the PN junction or by control of doping levels during diffusion. The total current through the above defined series path is then governed by the leakage current of diode $a$. The characteristic of diode D2 should be such that at the current value which is controlled by diode $a$ only a very small voltage drop occurs across diode D2 and substantially the total voltage $-V$ (which is approximately equal to $V_{11}$) is dropped across diode $a$. In actuality, the current through diode D2 should be approximately two times the current through diode $a$ since an identical leakage current path parallel to diode $a$ is provided by a backward biased PN junction $c$ of driver FET 13, through substrate 29 to voltage source $V_{sub}$. A voltage $-V$ is also developed at diode $c$ and this voltage is applied to node B to maintain capacitor 30 in a charged condition during the quiescent state of memory cell 1.

FIG. 1C shows typical diode voltage-leakage current characteristics which would produce the desired voltage division between diodes D1 and $a$ and $c$. Thus, the curve labeled leakage diode $a$ has a current which is substantially independent of voltage after an initial variation with applied voltage. The curve labeled leakage diode D2 also has a current which is substantially independent of voltage after an initial variation with voltage and is shown reversed with respect to the curve of diode $a$ to clearly indicate the amount of voltage dropped by diode D2 with the current of diode $a$ passing through it. Since the current of the curve of diode $a$ is much smaller than that which could be attained by diode D2, at the current of diode $a$, which is the maximum attainable through the series connected diodes ($I_a$ in FIG. 1C), the voltage drop across diode D2 is equal to a value which is very small relative to $-V$ and shown in FIG. 1C as $-V_{D2}$. The voltage drop across diode $a$ is shown in FIG. 1C as $-V_a$ which is substantially equal to $-V$. Thus, the voltage $-V$ which is substantially equal to $-V_a$ and $-V_{11}$ is maintained on gate 11 of ON FET during the quiescent state of memory cell 1 keeping the charge on the gate capacitance of that device substantially constant.

It should also be appreciated that a leakage current is the only current which flows through the ON device of the cross-coupled FET's quiescently. Assuming in FIG. 1B, that FET 3 is ON, a substantial short circuit path to ground is presented. However, the backward biased PN junction of diode D2 interposed between voltage $-V$ and ground now controls the leakage current and substantially the total voltage $-V$ is dropped across diode D2.

An experimental circuit incorporating the teaching of the present invention was fabricated which utilized FET's commercially available from Raytheon under the designation FN1024. The cross-coupled FET's utilized had a transconductance during operation of approximately 2,000 $\mu$ mhos while the driver FET's had a transconductance of approximately 1,000 $\mu$ mhos. In operation, the experimental circuit required a negative amplitude excursion of 8 to 10 volts from a ground potential on the word line, while a positive amplitude excursion to ground potential from a negative voltage of about 6 volts was required on the bit-sense lines. A substrate voltage of plus 6 to 8 volts was applied to the substrates of the FET's.

Returning to FIG. 1A, only a single sense amplifier 23 is shown connected to bit-sense line 19 via switch 22. It should be understood that a sense amplifier similar to amplifier 23 could be connected to bit-sense lines 18 in the same manner as amplifier 23 is connected to bit-sense line 19. The present arrangement merely halves the number of sense amplifiers required without affecting the overall operation of the circuit since the lack of an output current on a bit-sense line is just as significant as an output on a bit-sense line. It should be appreciated, however, that a differential amplifier, well known to those skilled in the electronics art, connected to the bit-sense lines of a memory cell may be utilized. The advantage of such an arrangement is that noise cancellation is obtained.

Referring again to FIG. 1A, a bistable circuit consisting of cross-coupled FET's 2 and 3 and diodes D1 and D2 can be obtained by simply disconnecting driver FET's 12 and 13 from nodes A and B, respectively. All other things being the same the resulting bistable circuit may be switched from one stable state to the other by applying a negative voltage $-Vp$ (shown as dotted pulse in FIG. 1A) to either nodes A or B, via dotted interconnection 38. Thus, if FET 3 is in the OFF condition, the application of $-Vp$ to node A will turn FET 3 ON. During the quiescent state, the bistable circuit is maintained in its switched condition by the voltage divider made up of diode D2 and diode $a$ as shown in FIG. 1B. Applying a negative voltage $-Vp$ to node B switches FET 2 in the same manner. The condition of the bistable circuit may be detected by reading the voltage at nodes A and B with a voltmeter. Alternatively, the voltage at nodes A and B may be applied via interconnection 38 to gates or trigger circuits (not shown) which are responsive to the presence of a voltage at their terminals. A diode 38' shown dotted in FIG. 1A may be interposed in interconnections 38 through which the voltage $-Vp$ is applied to nodes A and B.

Figure 3:
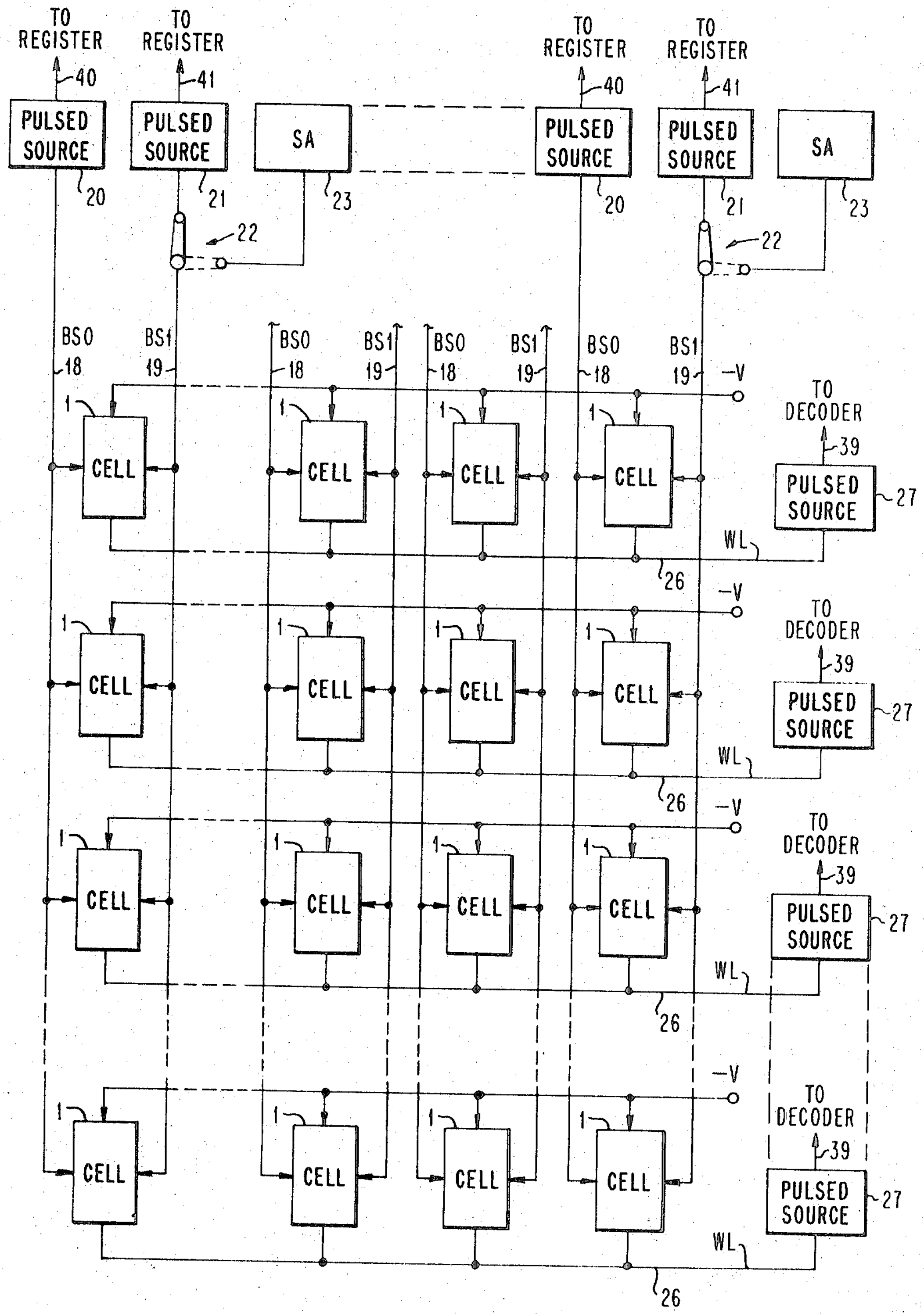
FIG. 3 is a schematic diagram of a plurality of cells of FIG. 1 connected in array form to show the operation of memory cells in a typical memory environment.

Referring now to FIG. 3, a schematic diagram of a plurality of cells of FIG. 1 is shown connected in array form to show the operation of memory cells in a typical memory environment. The reference numbers used in FIG. 1A are applied to the corresponding elements in FIG. 3 and memory cell 1 is shown, for purposes of simplification, as a "black box" with the required connections electrically coupling the circuit arrangement of FIG. 1A internally of the "black box".

In FIG. 3, a plurality of memory cells 1 are shown disposed in rows and columns to form an array which may have any number of bit positions in accordance with given design requirements. A bit position corresponds to a memory cell and a number of bit positions or cells associated with the same word line make up or store a word. As shown in connection with FIG. 1A, memory cell 1, can be selectively energized to assume one of its two possible states thereby storing information in binary form.

In FIG. 3, each of the memory cells 1 in any column is connected via bit lines 18 and 19 to pulsed sources 20 and 21, respectively, during a write period and bit line 19 is connected via switch 22 to a sense amplifier 23 during a read period. Sense line 19 is designated in FIG. 3 as BS 1 indicating that information stored by way of line 19 is representative of a binary one while sense line 18 is designated as BS 0 indicating that information stored by way of bit line 18 is representative of a binary zero.

Pulsed sources 27 are shown in FIG. 3 connected by way of word lines 26 to a plurality of rows of memory cells 1, each row containing a plurality of memory cells 1. Pulsed sources 27 are energized from a decoder (not shown) via connections 39 which selects only one of word lines 26 when information is to be written into or read from memory cells 1 associated with that one word line. When a word of information is to be stored, one of the pulsed sources 20 or 21 is simultaneously energized along with a single pulsed source 19 from a register or the like (not shown) via connections 40 or 41, respectively.

To read information into the top row of cells 1, pulsed source 27 associated with the top row is energized and, at the same time, some combination of pulsed sources 20 or 21 are energized to write binary ones or zeros into each of the memory cells 1 of the top row. If all the cells of the top row are to assume a binary one state, pulsed sources 21 are energized and information is applied over lines 19 (further designated as BS 1) simultaneously with the energization of the word line 26 of the top row. When the cells 1 of the top row are to assume a binary zero state, they are energized from pulsed sources 20 via bit lines 18 (further designated as BS 0) simultaneously with the energization of word line 26 of the top row from its associated source 27. The information placed in cells 1 of the top row could have been stored in any other row by simply energizing pulsed source 27 associated with that row rather than the source 27 associated with the top row. To read out information stored in the cells 1 of any row, the cells 1 of that row are energized from the source 27 associated with that row over its word line 26 and current flow or no current flow is detected in each of the sense amplifiers 23 depending on the state of each individual cell. Each of the cells 1 is written into, read from and maintained in a given state in the same manner described in connection with FIG. 1.

While the invention has been described hereinabove, in connection with specific devices, it should be appreciated that NPN devices can be substituted for PNP devices as long as proper polarity of diode D1 and D2 in the circuit is maintained. Where, for instance, NPN devices are used for cross-coupled and driver FET's, or switching transistors, the diodes D1 and D2 are reversed in the circuit and the pulse patterns of FIG. 2 are modified to have the word pulses as positive going pulses from a zero voltage and the bit pulses as negative going pulses from a positive value to zero.

In the foregoing, reference has been made to the active and quiescent states of the memory cell. It should be understood if it is not already apparent, for purposes of the foregoing disclosure, that reading and writing operations are accomplished during the active state and any other time is considered to be the quiescent state.

What has been disclosed is a memory cell incorporating backward biased diodes which provides extremely low power operation, a minimum amount of FET devices relative to known devices, maintenance of stored charge by leakage currents alone and which permits fabricating using only a single additional diffusion step.

While the invention has been particularly shown with reference to a preferred embodiment thereof, it will be understood by those skilled in the art that the foregoing and other changes in form and details may be made therein without departing from the spirit and scope of the invention.

We claim:

1. A memory cell having an active state and a quiescent state including a pair of cross-coupled transistors comprising
means connected to said pair of cross-coupled transistors for causing one of said pair to assume one of an OFF and ON condition during said active state and
leakage means a portion of which is integral with said transistors operative during said quiescent state to provide a given leakage current through one of said pair of transistors in the OFF condition and unidirectional means operative during the quiescent state to provide a leakage current higher than said given leakage current through one of said pair of transistors in the ON condition.

2. A memory cell according to claim 1 wherein said pair of transistors are unipolar transistors.

3. A memory cell according to claim 1 wherein said pair of transistors are NPN transistors.

4. A memory cell according to claim 1 wherein said pair of transistors are PNP transistors.

5. A memory cell according to claim 1 wherein said means for causing one of said pair to assume one of an OFF and ON condition includes gating means for applying varying voltages to said transistors to cause one of said like pair of transistors to conduct.

6. A memory cell according to claim 1 further including means coupled to said transistors to detect one of a voltage and a current through at least one of said transistors.

7. A memory cell according to claim 5 wherein said gating means is a diode connected to each of said transistors.

8. A memory cell according to claim 1 further including at least a voltage source connected to said leakage means.

9. A memory cell according to claim 1 wherein said means for causing one of said pair to assume one of an OFF and ON condition includes a driver transistor connected to each of said pair of cross-coupled transistors.

10. A memory cell according to claim 1 wherein said unidirectional means is a backward-biased diode.

11. A memory cell according to claim 9 wherein said leakage means further includes another portion integral with said driver transistors operative to pass said given leakage current during said quiescent state.

12. A memory cell according to claim 9 further including a first pulsed voltage source having a common connection to said driver transistors and second and third voltage sources being connected to one and the other of said driver transistors, respectively.

13. A memory cell according to claim 11 wherein said portion integral with said transistors and said another portion integral with said driver transistors are back-biased PN junctions.

14. A memory cell having an active state and a quiescent state comprising:
first and second field effect transistors each having source, drain and gate electrodes,
said gate electrodes of said first and second transistors being cross-coupled to said drain and said source electrodes connected to a common potential,
third and fourth field effect transistors each having source, drain and gate electrodes disposed in series with said first and second field effect transistors, respectively, said drain electrodes of the former being connected to said source electrodes of the latter and said gate electrodes of said third and fourth transistors being interconnected,
first and second diodes disposed in series with said first and second field effect transistors, respectively, and in parallel with said third and fourth field effect transistors, respectively,
a first pulsed source connected to said gates of said third and fourth field effect transistors,
second and third pulse sources connected to said drains of said third and fourth transistors, respectively, said first pulsed source and one of said second and third pulsed sources being actuated to set one of said first and second transistors in the conducting condition, said first pulse source only being actuated to determine which of said first and second transistors is conducting during the active state, and
leakage means a portion of which is integral with a portion of each of said transistors said leakage means being operative to provide leakage currents only in said transistors during the quiescent state.

15. A memory cell according to claim 14 further including amplifier means connected to at least one of said third and fourth field effect transistors to detect the conducting condition of one of said first and second transistors.

16. A memory cell according to claim 14 wherein said leakage means includes said first and second diodes.